United States Patent [19]

Pascaloff

[11] Patent Number: 4,641,551

[45] Date of Patent: Feb. 10, 1987

[54] APPARATUS FOR TRANSLATING ROTATIONAL MOTION AND TORQUE

[75] Inventor: John H. Pascaloff, Galeta, Calif.

[73] Assignee: Hall Surgical, division of Zimmer, Inc., Carpinteria, Calif.

[21] Appl. No.: 565,414

[22] Filed: Dec. 27, 1983

[51] Int. Cl.⁴ ........................ F16H 57/10; F16H 5/52; B23B 47/14

[52] U.S. Cl. ........................................ 74/785; 74/337; 74/665 K; 408/126; 408/133

[58] Field of Search ...................... 74/337, 665 K, 785, 74/371, 750 R; 408/126, 132, 133; 192/56 R

[56] References Cited

U.S. PATENT DOCUMENTS

| | | | |
|---|---|---|---|
| 2,884,814 | 5/1959 | Schott | 74/785 |
| 2,950,490 | 8/1960 | Schwartz et al. | 408/133 |
| 3,430,521 | 3/1969 | Kulman | 74/750 R |
| 3,593,830 | 7/1971 | Clapp et al. | 192/56 R X |
| 3,612,236 | 10/1971 | Fernstrom et al. | 192/56 R |
| 3,613,751 | 10/1971 | Johasz | 192/56 R X |
| 3,752,278 | 8/1973 | States | 192/56 R |
| 3,872,742 | 3/1975 | States | 74/785 |
| 3,960,035 | 6/1976 | Workman, Jr. et al. | 74/785 |
| 4,040,311 | 8/1977 | Page, Jr. et al. | 74/750 R |
| 4,174,621 | 11/1979 | Woltjen | 192/56 R X |
| 4,306,865 | 12/1981 | Leonard | 74/801 X |
| 4,373,923 | 2/1983 | Kilwin | 192/56 R X |
| 4,411,173 | 10/1983 | Mixer | 74/785 |

*Primary Examiner*—Kenneth J. Dorner
*Assistant Examiner*—Joseph M. Rolnicki
*Attorney, Agent, or Firm*—Robert D. Yeager

[57] ABSTRACT

The present invention provides apparatus which can be incorporated into a powered instrument that rotates a tool at varying rotational speeds and torques. The invention includes at least two drive plates, each of which rotates at a different speed and which exerts a different magnitude of torque. A movable member within the instrument selectively engages one of the two drive plates to couple that drive plate to the output shaft of the instrument. The apparatus can include a torque limiter which couples the input shaft to the output shaft only when the resistance to rotation offered by a drive plate is less than a predetermined value.

2 Claims, 4 Drawing Figures

APPARATUS FOR TRANSLATING ROTATIONAL MOTION AND TORQUE

BACKGROUND OF THE INVENTION

1. Field of the Invention

The present invention relates generally to instruments for rotating tools and, more particularly, to apparatus for transmitting rotational motion and torque to a tool.

2. Description of the Prior Art

Several types of powered surgical instruments are commonly used during the performance of orthopedic surgical procedures. The instruments rotate tools which are adapted to engage and shape human bone. Three common types of powered instruments used during performance of orthopedic surgery are drills, reamers and screwdrivers.

As in nonmedical applications, drills are used to form bores in bone. The drilling operation requires a powered instrument that is capable of rotating a drill bit at a relatively high rate of speed.

Powered reamers are used generally to shape certain areas of bone. The bit of a reamer usually defines a relatively large cutting surface and, accordingly, contacts and cuts a relatively large area of the bone. Reaming, therefore, requires a greater amount of torque than drilling. The speed with which the reaming bit is rotated must be less than that at which a drill bit is rotated.

A powered screwdriver instrument is used to insert fasteners into bone. The screwdriver bit of a powered screwdriver must be rotated at a speed that is lower than that at which a drill bit is rotated and, generally, can be rotated at about the same speed as that at which reaming bits are rotated. Unlike the reaming bit, the torque exerted on the screwdriver bit as it is driving a fastener into bone must be limited. Due to this requirement, a powered screwdriver should include a torque limiter to ensure that the fastener is not overdriven into the bone.

In addition to drills, reamers, and driving fasteners the power instrument can be used with other types of tools which require the power instrument to receive through the rear of the power instrument articles for insertion into the surgical site. Therefore, the power instrument must be cannulated.

The varying characteristics of the rotational motion which must be transmitted to drilling, reaming and screwdriving bits have prompted workers in the art to provide a different surgical instrument for performing each type of surgical procedure described above. Because more than one type of procedure must be employed commonly during the course of an operation, the orthopedic surgeon must substitute one instrument for another continually, at great inconvenience to the surgeon.

Accordingly, there is a need for a surgical instrument that can deliver rotational motion at varying speeds and varying torque. Further, there is a need for such an instrument that includes a torque limiter.

SUMMARY OF THE INVENTION

The present invention provides apparatus for transmitting rotational motion and torque from a rotating input member to an output member. The apparatus includes a first drive member so coupled to the input member that it can rotate at a first maximum angular velocity and exert a first maximum torque. The apparatus includes a second drive member so coupled to the input member that it can rotate at a second maximum angular velocity and exert a second maximum torque. A coupling member is so coupled to the output member that rotation of the coupling member causes corresponding rotation of the output member. The coupling member includes an engaging member adapted to selectively engage and couple to the coupling member the first drive member or the second drive member to cause the coupling member to rotate therewith. Finally, the apparatus includes apparatus for causing the coupling member to become engaged with the first or second drive members.

Preferably, at least one additional drive member is so provided and is coupled to the input member that rotation of the input member causes corresponding rotation of that member only if the resistance to rotation offered by that drive member is less than a predetermined value.

Accordingly, the present invention can be incorporated into a powered instrument adapted to provide an instrument capable of rotating a tool at different rotational speeds and torques of differing magnitudes. Further, use of the present invention provides such a rotating powered instrument that includes a torque limiter.

It should be noted that, although the present invention is discussed herein as it is used in a powered surgical instrument, the present invention is useful for providing a powered instrument that can deliver varying rotational speeds and torques in nonmedical applications.

BRIEF DESCRIPTION OF THE DRAWINGS

The following detailed description of the preferred embodiments can be understood better if reference is made to the accompanying drawings in which.

DETAILED DESCRIPTION OF THE PREFERRED EMBODIMENTS

Figure 1:
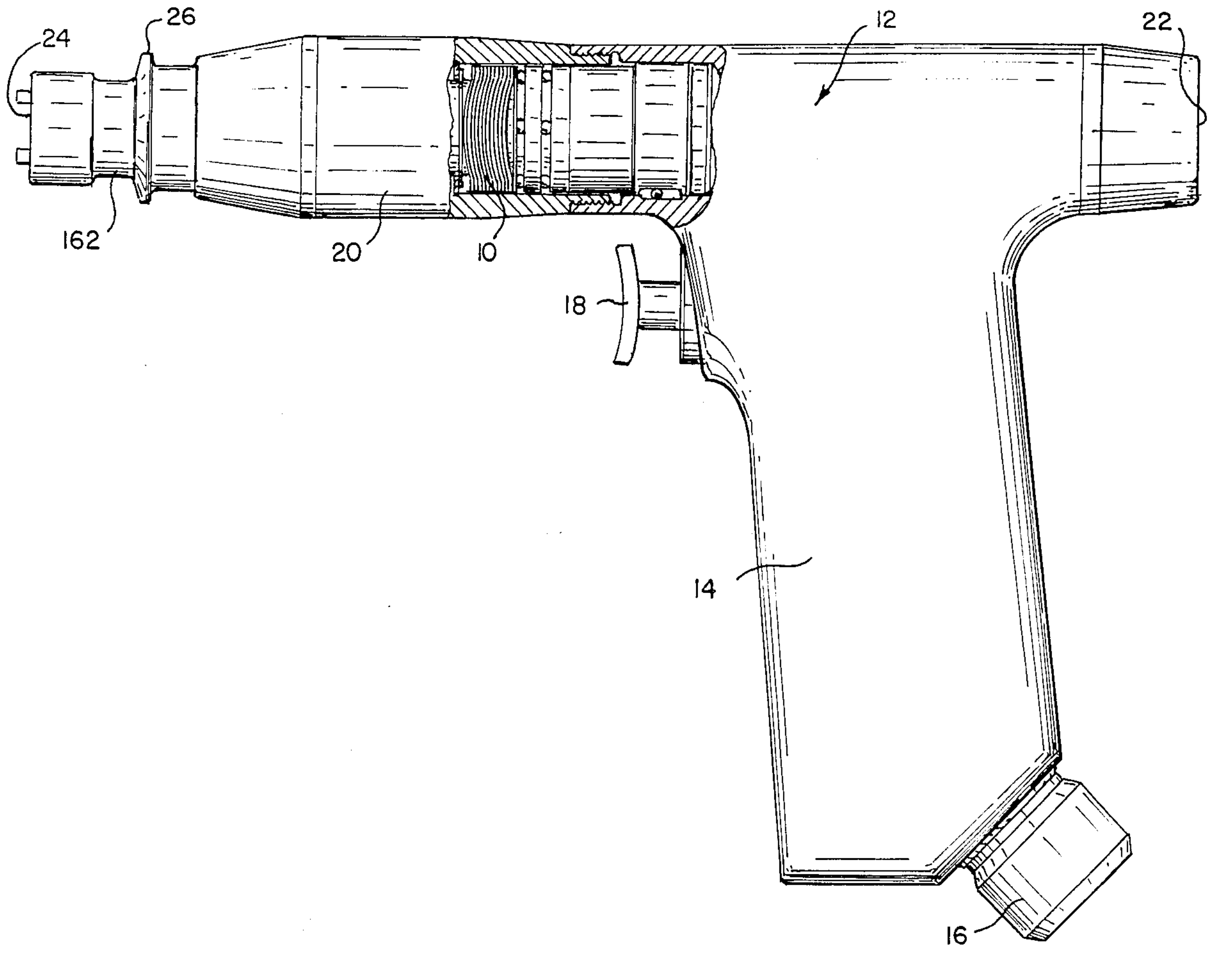
FIG. 1 is a side elevational view of a powered surgical instrument, partially in cutaway, which incorporates the preferred embodiment of the present invention.

FIG. 1 shows a powered surgical instrument 12 which includes transmission 10, the preferred embodiment of the present invention. Chuck housing 162 defines an annular ring 26 which is used to push chuck housing 162 toward upper housing 20 to insert tools within and remove tools from instrument 12. Instrument 12 is particularly adapted to perform drilling, reaming and screwdriving operations. Instrument 12 defines a grip 14 which houses the motor assembly and transmission assembly that transmits rotational motion and torque from the motor assembly to transmission 10. Power is received by grip 14 through a connector 16. Trigger assembly 18 is used to initiate and control rotation of the output shaft of instrument 12. A cannula can be inserted throughout the length of upper housing 20 of instrument 12 through its end 22. End 24 receives drilling, reaming or screwdriving bits. Upper housing 20 includes chuck housing 24 which is used to secure bits to instrument 12.

Figures 2, 3:
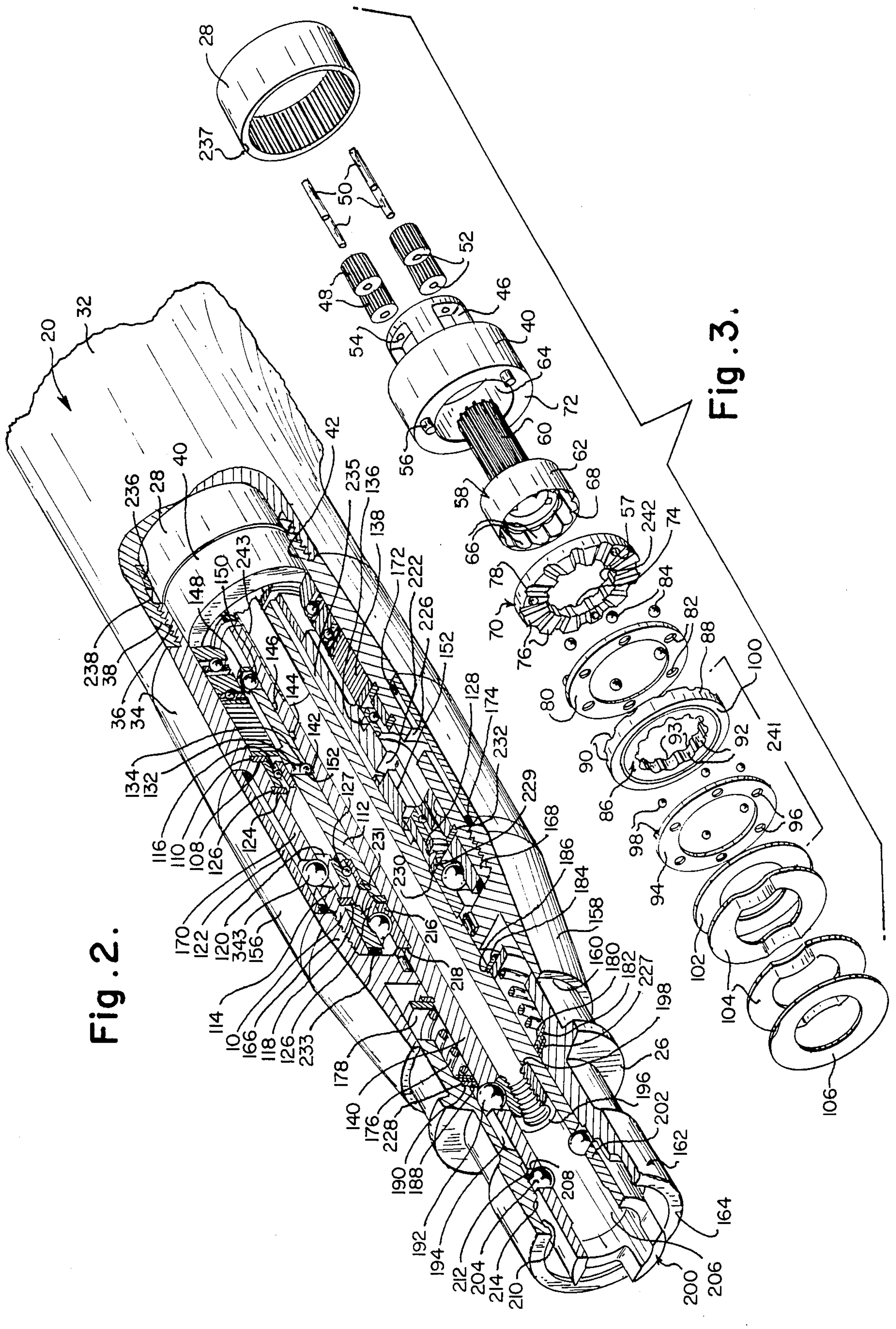
FIG. 2 is an isometric view, partially in cutaway, showing the preferred embodiment of the present invention shown in FIG. 1.
FIG. 3 is an exploded view of a portion of the preferred embodiment of, the present invention, showing the torque limiter, drive plates, geared drive member and gear assembly of the preferred embodiment.
Figure 4:
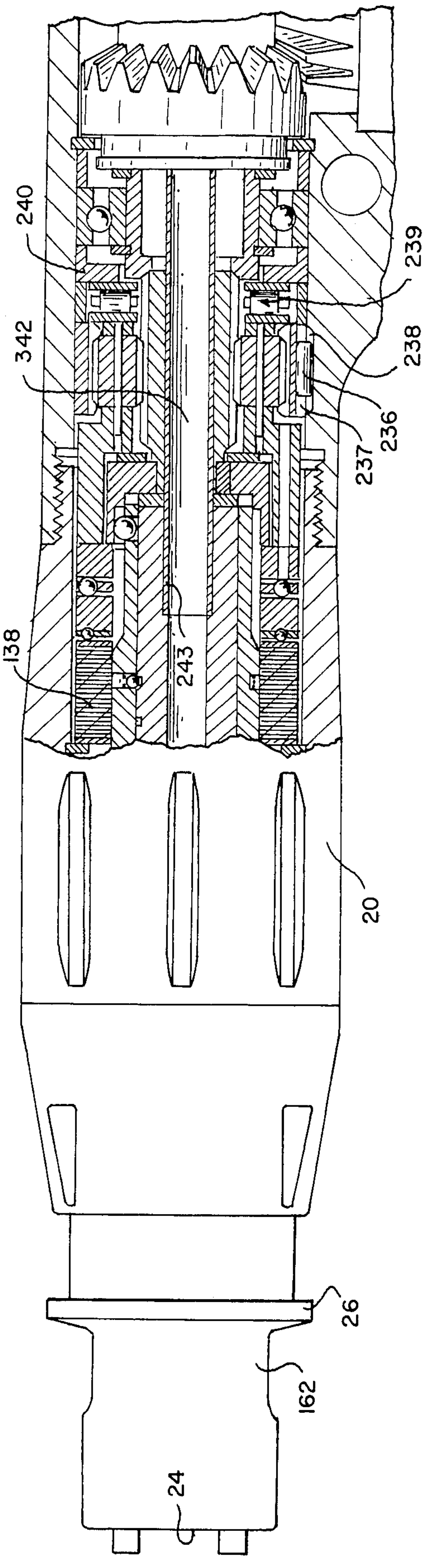
FIG. 4 is a side sectional view of a portion of the powered instrument shown in FIG. 1.

As can be seen in FIGS. 2 through 4, upper housing 20 generally contains transmission 10, a drive shaft 140 and chuck assembly 200. Upper housing 20 includes a rear section 32, a middle section 34, an actuator sleeve 156 and a forward section 158. Opening 160 defined by forward section 158 receives one end of chuck housing 162. Drive shaft 140, which rotates a bit, extends generally from forward end 164 of chuck housing 162 through upper housing section 20 to the forward end of rear section 32. Middle section 34 defines threaded section 36 which is threaded into threaded section 38 of rear section 32 to join sections 34 and 32. Threaded section 166, defined by forward section 158, is threaded into threaded section 168, defined by middle section 34, to join sections 158 and 34. Actuator sleeve 156 is slid onto section 170 defined by middle section 34 before section 158 is joined with section 34. Actuator sleeve 156 is constrained between shoulder 172, defined by section 34, and end 174 of forward section 158.

A spring 176 is disposed around shaft 140 between washer 178 and retaining plate 180. Retaining plate 180 is held in place by spring 176 and shoulder 182, which is formed by chuck housing 162. Washer 178 is held in place by spring 176 and snap ring 184, which is disposed in groove 186 defined by shaft 140. Spring 176 urges chuck housing 162 away from forward section 158. Travel of chuck housing 162 away from forward section 158 is limited by spacer 188 which is located against shoulder 190. Spacer 188 is retained against shoulder 190 by snap ring 227 which is disposed in groove 228 defined by chuck housing 162. Forward travel of chuck housing 162 is limited by ball 192, which is disposed in opening 194 defined by shaft 140. Ball 192 is held in place by expandable insert 196. Expandable insert 196 is fixed within shaft 140 by inserting insert 196 within shaft 140 to shoulder 198. The inner surface of insert 196 is threaded for installation tooling.

A chuck 200 is defined at the end of shaft 140 for the receipt of the shank of a tool or bit. Chuck 200 defines three openings 202, each of which receives a ball 204. Openings 202 are so configured that balls 204 can extend partially into bore 206 defined by shaft 140, but cannot fall completely through openings 202 to the interior of shaft 140. Chuck housing 162 defines actuating surface 208 which defines a low portion 210 and a high portion 212 connected by a ramp portion 214. Spring 176 urges chuck housing 162 toward its engaging position shown in FIG. 2 in which balls 204 are capable of bearing against the shank of a tool disposed within chuck 200. Balls 204 are held against the shank by high portion 212 of actuating surface 208. To remove the tool from chuck 200, chuck housing 162 is pushed by hand toward forward section 158 until balls 204 travel down ramp section 214 and are confronted by low portion 210, in which position they are no longer capable of bearing against the shank of the tool to hold it within chuck 200. The shank can then be removed from chuck 200.

Shaft 140 is held in place by a bearing 216 disposed against shoulder 218 formed by shaft 140. The bearing 216 is held snug against shoulder 218 by a wave washer 229 and snap ring 230, which is disposed in groove 231 defined by shaft 140. The shaft and bearing assembly (216, 140, 229 and 230) is constrained in the assembly between snap ring 118, which is disposed in groove 232 defined by section 170, and an O-ring 233 which is trapped between bearing 216 and surface 234 defined by forward section 158. A key 152 is entrapped between slide 112 and shaft 140. The mechanism is designed to allow key 152 to slide in slot 235 defined by shaft 140. The key is entrapped in slot 222 defined in slide 112. Accordingly, rotation of slide 112 causes rotation of shaft 140. Generally, slide member 112 is adapted to be slid along shaft 140 to engage one of three drive plates. One drive plate provides high speed, low torque rotation for drilling. A second drive plate provides low speed, high torque rotation for reaming. A third drive plate provides low speed and limited torque for screwdriving. Key 152 is adapted to slide along surface 235 as slide member 112 is slid among its three positions.

Axial movement of slide member 112 is achieved by rotation of actuating sleeve 156. Section 170 of middle section 34 defines two asymetric grooves 226 diametrically opposed, each of which receives a ball 343. Rotation of actuator sleeve 156 causes each ball 343 to travel along a groove 226. Accordingly, rotation of actuator sleeve 156 causes axial movement of balls 343 which, through ring 122 and bearing 114 produces axial movement of the slide 112.

FIGS. 2, 3 and 4 show the details of transmission 10. A ring gear 28 is rigidly secured in a bore 30 formed in section 32 of upper housing 20. Rotation of ring gear 28 is prevented by pin 236 which is locked between groove 237 defined by ring gear 28 and groove 238 defined by section 32 of housing 12. Section 34 of upper housing 20 defines a threaded portion 36 which is threaded into threaded portion 38 defined by member 32. A planetary carrier 40 is mounted for rotation within bore 42 defined by member 34. Carrier 40 defines a gear mount 44. Gear mount 44 defines multiple openings (only two shown) 46, each of which is adapted to receive a planetary gear 48. Each planetary gear 48 is secured within an opening 46 with a shaft 50, which passes through bore 52 defined by gear 48. Each end of a shaft 50 is secured within opening 54 (only one shown for each opening 46) defined by gear mount 44. Each planetary gear 48 is free to rotate within opening 46 around a shaft 50. The planetary carrier 40 defines three keys 56 (only two shown).

Geared drive member 58 defines a geared shaft 60 and a drive plate 62. Geared drive member 58 is mounted within planetary carrier 40. Planetary carrier 40 defines a bore 64 which is so sized that it can receive plate 62 of geared drive member 58. Geared shaft 60 extends through gear mount 44 of planetary carrier 40 and is coupled to the female input drive shaft (not shown). Accordingly, geared drive member 58 rotates at the same speed as the input drive shaft. The number of teeth formed on geared shaft 60, planetary gear 48 and ring gear 28 are so chosen that planetary carrier 40 rotates at about one-third the rotational velocity as the input drive shaft. Accordingly, a three to one increase in torque is provided to planetary carrier 40.

The inner surface of drive plate 62 defines twelve grooves 66, each of which defines a portion of a circle. End 68 of each groove 66 is beveled for reasons explained below.

A drive plate 70 is secured to surface 72 of planetary carrier 40 and rotates therewith. Three openings 57 receive keys 56 located on surface 72. The inner surface of drive plate 70 defines twelve grooves 74, each of which defines a portion of a circle. Surface 76 defines twelve generally V-shaped notches 78. End 242 of each groove 74 are beveled.

A ball retainer or clutch plate 80 defines circular openings 82, each of which receives a ball 84. A second drive plate 86 includes a surface 88 which defines twelve V-shaped notches 90. The inner surface of drive plate 86 defines twelve grooves 92, each of which defines a portion of a circle. Ball retainer 80 is adapted to be disposed between drive plates 70 and 86. Each ball 84 protrudes from both sides of ball retainer 80 and is adapted to be received, in part, by a notches 78 and a notches 90 of drive plates 70 and 86, respectively.

A bearing plate 94 defines six openings 96, each of which receives a ball 98. Plate 94 is disposed between surface 100 of drive plate 86 and a washer 102. A series of twenty-eight wave washers 104 stacked parallel with each other is disposed between washer 102 and a washer 106.

Washer 106, wave washers 104, washer 102, bearing plate 94, drive plate 86, ball retainer 80 and drive plate 70 are stacked around drive shaft 140 and between a snap ring 108, located in a groove 110 formed on the inside surface of housing section 34, and thrust bearing 239 which is disposed against thrust plate 240, which is secured in section 32 of housing 12. Thrust bearings 239 and 241 allow rotation of transmission assembly 10 within bore 42. Thrust bearings 239 and 241 allow wave washers 104 to exert force on washer 102 to force drive plates 86 and 70 against surface 72 of planetary carrier 40. Accordingly, rotation of drive plate 70 causes corresponding rotation of drive plate 86, if the resistance to rotation offered by drive plate 86 is below a predetermined value. If the resistance to rotation of drive plate 86 is greater than the predetermined value, each ball 84 is forced out of the grooves 78 and 90 in which it is disposed and drive plate 86 slips relative to drive plate 70. Accordingly, drive plate 86, ball retainer 80 and drive plate 70 form a torque limiter which establishes the maximum torque that can be delivered by drive plate 86. The predetermined value of resistance at which drive plate 86 slips is determined by the nature and number of wave washers 104 provided.

Instrument 12 includes a slide member 112 which is used to select the characteristics of the rotational motion provided by instrument 12. Movement of slide 112 is permitted in the radial direction and is prevented in the axial direction by a pair of bearings 114 and 116. Bearing 116 is held in place by snap ring 124, located in groove 126 formed in housing section 34, and snap ring 110. Bearing 114 prevents axial movement of ring 120 relative to slide 112. Snap ring 126 is disposed in groove 128, formed in slide 112, and cooperates with shoulder 130 to fix the inner ring of bearing 114 in place.

Slide member 112 defines three openings 132, each of which receives an indexing ball 134. An annular groove 136 joins openings 132 and receives a spring band 138 which urges balls 134 against the outer surface of shaft 140. Shaft 140 defines three grooves 142, 144 and 146 which are adapted to receive balls 134. Slide 112 is in a position to engage plate 86, 70 or 62 when balls 134 are located in a groove 142, 144 or 146, respectively. In particular, instrument 12 is in the screwdriving mode when balls 134 are disposed in groove 142, the reaming mode when balls 134 are disposed in groove 144, and the drilling mode when balls 134 are disposed in groove 146.

Slide 112 defines three openings 148, each of which receives an engaging ball 150. Each engaging ball 150 is urged by shaft 140 into a groove 66, 74 or 92 of drive plates 62, 70 or 86, respectively, depending on the position of slide 112. Accordingly, the drive plate whose grooves receive engaging balls 150 causes slide member 112 and, through key 152, shaft 140 to rotate.

To secure a tool to instrument 12, chuck housing 162 is pushed toward forward section 158 until low portion 210 confronts balls 204. The shank of the tool is inserted within bore 206 defined by shank 140 and chuck housing 162 is released. Spring 176 urges chuck housing 162 away from forward section 158 until spacers 190 contact balls 192, at which point high portion 212 urges balls 204 against the shank of the tool to secure it within chuck 200. Then, the mode of operation of instrument 12 is selected. If the screwdriving mode is desired, actuator sleeve 156 is rotated in the proper direction until balls 228 move within grooves 226 to move ring 122 and slide 112 to the position in which balls 134 are received by groove 142. In that position, balls 150 are received by three recesses 92 of drive plate 86. As long as the resistance to rotation offered by drive plate 86 is below the predetermined value set by wave washers 104, the rotating planetary carrier 40 will rotate drive plates 70 and 86, at the reduced speed, which will rotate slide 112. Rotation of slide 112 is transmitted to shaft 140 by key 152.

If the reaming mode is desired, actuator sleeve 156 is rotated until balls 134 are disposed within groove 144, in which position balls 150 are located within three recesses 74 of drive plate 70. In such a position, drive plate 70 rotates at the reduced speed provided by planetary carrier 40. The beveled ends 242 of grooves 74 aid in guiding balls 150 into grooves 74. In the reaming mode, drive plate 70 directly drives slide 112 and shaft 140, and the torque limiting apparatus is bypassed.

If the drilling mode is desired, actuator sleeve 156 is rotated until balls 134 are disposed within groove 146, in which position balls 150 are located within three grooves 66 of plate 58. The beveled ends 68 of grooves 66 and 242 of grooves 74 aid in guiding balls 150 between grooves 66 and 74. In the drilling mode, the gear assembly formed by planetary carrier 40, planetary gears 48 and ring gear 28 is bypassed to provide direct coupling between the input shaft and drive plate 62.

A tubular insert 342 is secured in counter bore 243 defined by shaft 140. This tubular insert 342 extends through geared shaft 60 and through instrument 12 to knob 22 where it protrudes through a seal to prevent contamination from entering the mechanism.

What is claimed is:

1. Apparatus for transmitting rotational motion and torque from a rotating input shaft to an output shaft comprising:

a geared drive member coupled by a gear assembly to the input shaft, rotation of the input shaft causing rotation of the geared drive member through said gear assembly, said geared drive member defining a recess adapted to receive an engaging member;

a drive plate so coupled to the input shaft that rotation of the input shaft causes corresponding rotation of said drive plate, said drive plate defining a recess for receiving said engaging member;

a coupling member so coupled to the output shaft that rotation of said coupling member causes corresponding rotation of the output shaft, said engaging member being mounted to said coupling member;

said coupling member, said geared drive member and said drive plate being mounted for relative movement between (i) said geared drive member and said drive plate and (ii) said coupling member, receipt of said engaging member by a said recess being achieved by said relative movement;

said drive plate or said geared drive member being capable of transmitting rotational motion and torque to said coupling member when said recess of said drive plate or said geared drive member receives said engaging member; and means for causing said relative movement between said coupling member, said drive plate and said geared drive member.

2. The apparatus recited in claim 1 further comprising:

a second drive plate defining a recess for receiving said engaging member, said second drive plate being capable of transmitting rotational motion and torque to said coupling member when said engaging member is received by said recess of said second drive plate, said second drive plate being so coupled to the input shaft that (i) said second drive plate tends to resist being rotated by said input shaft and (ii) rotation of the input shaft causes corresponding rotation of said second drive plate only when said resistance to rotation offered by said second drive plate is less than a predetermined value.

* * * * *